United States Patent [19]

Marcilly et al.

[11] 4,217,205
[45] Aug. 12, 1980

[54] CATALYSTS FOR HYDROCARBON CONVERSION

[75] Inventors: Christian Marcilly, Houilles; Jean-Francois Le Page, Rueil Malmaison; Germain Martino, Poissy; Jean Miquel, Paris, all of France

[73] Assignee: Societe Francaise des Products pour Catalyse, Rueil-Malmaison, France

[21] Appl. No.: 936,966

[22] Filed: Aug. 25, 1978

[30] Foreign Application Priority Data

Aug. 26, 1977 [FR] France ................... 77 26278

[51] Int. Cl.$^2$ ............................................. C10G 35/08
[52] U.S. Cl. ..................... 208/139; 252/441; 585/419
[58] Field of Search .............. 208/139; 252/441; 585/419

[56] References Cited

U.S. PATENT DOCUMENTS

| | | | |
|---|---|---|---|
| 3,661,769 | 5/1972 | Venuto et al. | 208/139 |
| 3,871,995 | 3/1975 | Duhaut et al. | 208/139 |
| 3,880,748 | 4/1975 | Sawyer | 208/136 |
| 3,887,495 | 6/1975 | Juguin et al. | 252/464 |
| 3,898,178 | 8/1975 | Duhaut et al. | 208/139 |

FOREIGN PATENT DOCUMENTS 2091114  1/1972  France.

Primary Examiner—C. Davis
Attorney, Agent, or Firm—Millen & White

[57] ABSTRACT

Catalyst, particularly useful in catalytic reforming and for producing highly pure aromatic hydrocarbons, comprising an alumina carrier and containing, expressed in proportion of the weight of the alumina carrier:

0.005 to 1% of platinum
0.01 to 4% of gallium, indium or thallium
0.01 to 2% of tungsten, and
0.1 to 10% of halogen.

21 Claims, No Drawings

NEW CATALYSTS FOR HYDROCARBON CONVERSION

BACKGROUND OF THE INVENTION

This invention concerns a new acid catalyst comprising (a) a carrier, (b) platinum, (c) a second metal selected from the group consisting of gallium, thallium and indium, (d) tungsten and (e) halogen.

The invention also relates to the use of this catalyst in catalytic reforming reactions and in the production of highly pure aromatic hydrocarbons ("aromizing").

Catalysts containing platinum deposited on a carrier have been known for a long time for use in catalytic reforming. However, in spite of numerous improvements brought to these catalysts up to now, for example by incorporation of such additives as tungsten, molybedenum, rhenium, germanium, iridium, and the like it is still of interest to investigate new catalysts based on platinum which, on the one hand, would give still better yields than those obtained up to now and which, on the other hand, would also have a longer life time than the known catalysts. Moreover, it is desirable to improve the mechanical properties of these catalysts; as a matter of fact, these catalysts are used generally in fixed or moving bed, in the form of conglomerates, for example balls or extrudates of a substantial size so as to promote relatively easy passage of the gaseous reactants. The wear of these catalysts results in the formation of much smaller particles which, progressively, clog the free space and make it necessary to increase the inlet pressure of the reactants or even to discontinue the operation.

DETAILED DISCUSSION

Whereas, previously, it was known that high yields are obtained, particularly in reforming reactions, by using a catalyst with a porous carrier (particularly alumina) also containing platinum and gallium, or thallium, or indium, it has now been discovered that such a catalyst exhibits an increased activity and, above all, a longer life time, when tungsten is incorporated as a third additional metal element to the metal system, these three-metal systems being more efficient than the three-metal systems already proposed in the prior art, particularly those containing (1) platinum, (2) tungsten and (3) germanium or tin. When using a catalyst according to this invention, the yields do not decrease over long periods.

The catalyst carrier is alumina. The catalyst according to the invention contains, by weight with respect to the catalyst carrier, 0.005 to 1% and more particularly 0.05 to 0.8% of platinum, 0.01 to 4% and preferably 0.05 to 3% and more particularly 0.3 to 0.9% of a metal selected from thallium, gallium and indium and 0.01 to 2%, more particularly 0.1 to 0.3%, of tungsten.

The catalyst also contains 0.1 to 10% and preferably 0.2 to 5% by weight, with respect to the catalyst carrier, of halogen, for example chlorine or fluorine.

The structural properties of the catalyst carrier may also be of importance; in order to proceed at sufficiently high space velocities and to avoid the use of reactors of a too large capacity and the use of an excessive amount of catalyst, the specific surface of the alumina carrier may be advantageously from 50 to 600 m$^2$ per gram, preferably from 150 to 400 m$^2$/g or better 180–400 m$^2$/g.

The catalyst may be prepared according to conventional methods consisting of impregnating the carrier by means of solutions of compounds of the metals to be introduced. There is used either a common solution of these metals or separate solutions are used for each metal. When using several solutions, intermediate steps of drying and/or rotating are advisable. The operation is usually completed with a roasting step, for example between about 500° and 1000° C., preferably in the presence of free oxygen, for example by air scavenging.

Platinum may be used in any known form, for example, as hexachloro platinic acid, ammonium chloroplatinate, platinum sulfide, sulfate or chloride. Tungsten may be used in any known form, such as the chloride, the bromide, or any other salt or oxide of the metal which is soluble in water, hydrochloric acid or in any suitable solvent (for example, tungstates, silicotungstates, and the like). There can also be mentioned the organic and inorganic complexes containing tungsten (acetylacetonates, oxalate or tartrate complexes and others).

Examples of metal compounds of gallium, indium or thallium are for example, the nitrates, chlorides, bromides, fluorides, sulfates or acetates of said metals or even any other salt or oxide of these metals which is soluble in water, hydrochloric acid or in any other suitable solvent (for example chromates, molybdates, etc . . . ). There can still be mentioned the heteropolyacids and organic and inorganic complexes containing these additional metals (acetylacetonates, oxalate, tartrate or citrate complexes and others).

The halogen may originate from one of the above mentioned halides or may be introduced as hydrochloric acid or hydrofluoric acid, ammonium chloride, ammonium fluoride, gaseous chlorine or hydrocarbon halides, for example, CCl$_4$, CHCl$_3$ or CH$_3$Cl.

A first method of preparation consists, for example, of impregnating the carrier by means of an aqueous solution of the nitrate or of any other compound of a metal selected from gallium, indium and thallium, of drying at a temperature of about 120° C. and roasting in air for a few hours at a temperature from 500° to 1000° C., preferably at about 700° C.; then a second impregnation is performed by means of a platinum containing solution, (for example by means of hexachloroplatinic acid) and then of a tungsten containing solution (for example by means of a solution containing ammonium metatungstate).

Another method consists, for example, of impregnating the carrier by means of a solution simultaneously containing:

(1) platinum (for example as hexachloroplatinic acid)
(2) tungsten (for example as ammonium metatungstate)
(3) a metal selected from gallium, indium and thallium, introduced in the form of one of the various compounds listed above.
(4) chlorine or fluorine.

Still another method consists of first introducing tungsten by means of a solution thereof followed or not with a drying and a roasting step, then introducing platinum by means of a solution thereof, followed or not with a drying and a roasting step and, finally, introducing a third metal selected from gallium, indium and thallium in one of the various forms mentioned above, the latter impregnation being followed with a drying and a roasting step at a temperature, for example, from 500° to 1000° C.

It is obvious that the order of the different impregnation steps, as mentioned above, is not compulsory and may be chosen different.

All of these methods provide for a good homogeneous impregnation of the alumina carrier with the metal elements.

The so-obtained acid catalysts may be used in reforming reactions (hydroreforming) and in reactions for producing highly pure aromatic hydrocarbons.

The operating conditions of the reforming or hydroreforming or catalytic hydroreforming reactions are as follows: the average temperature is between about 450° and 580° C., the pressure is from 5 to 20 kg/cm², the hourly rate is from 0.5 to 10 volumes of liquid naphtha per catalyst volume and the recycle rate is from 1 to 10 moles of hydrogen per mole of charge. The charge is usually a naphtha distilling between about 60° C. and about 220° C., particularly a straight run naphtha.

The reactions for producing aromatic hydrocarbons use as starting materials unsaturated or saturated gasolines (for producing benzene, toluene and xylenes). When the feed charge is unsaturated i.e. when it contains diolefins and monoolefins, it must be first made free thereof by selective or complete hydrogenation. Then the charge, optionally made free, by hydrogenation, of substantially all the diolefins and monoolefins contained therein, if any, is subjected to a hydrogen treatment in the presence of a catalyst at a temperature from about 530° to 600° C. under a pressure from 1 to 60 kg/cm², the hourly flow rate by volume of the liquid charge being from about 0.1 to 10 times the volume of the catalyst, the molar ratio hydrogen/hydrocarbons being from about 0.5 to 20. The charge may consist of gasolines obtained by cracking pyrolysis, particularly steam-cracking or catalytic reforming or may also consist of naphthenic hydrocarbons liable to be converted to aromatic hydrocarbons by dehydrogenation.

EXAMPLE 1

Five catalysts A to E which all have a specific surface of 220 m²/g, a pore volume of 0.57 cc/g and a chlorine content of 1.18%, are prepared. These catalysts all contain, by weight with respect to the carrier, 0.20% of platinum, 0.2% of tungsten and 0.5% of a metal element which, for each of catalysts A to E is respectively:

A—Tin
B—Indium
C—Thallium
D—Germanium
E—Gallium (Catalysts A and D, already used in the prior art are tested here by way of comparison).

Catalysts A to E have all been prepared with an alumina having a specific surface of 250 m²/g and a pore volume of 0.59 cc/g.

Catalyst B has been prepared by adding to 100 g of alumina, 65 cc of an aqueous solution containing:

1.90 g of a concentrated aqueous solution of hydrochloric acid (specific gravity: 1.19)
10 g of an aqueous solution of chloroplatinic acid with a 2% by weight platinum content.
8 g of an aqueous solution of ammonium metatungstate containing 2.5% by weight of tungsten.
1.87 g of indium nitrate containing 26.75% by weight of indium.

The contact is maintained for 10 hours.

The product is dried in an oven at 100° C. for 6 hours, then roasted in a dry air stream for 2 hours at 350° C. and then for 2 hours at 530° C.

It is then reduced in a dry (activated alumina) hydrogen stream for 2 hours at 450° C.

The resulting catalyst contains as mentioned above, and by weight with respect to the carrier:
0.20% of platinum
0.20% of tungsten
0.50% of indium
1.18% of chlorine.

Catalysts A, C, D, and E have been prepared in the same manner, except that the impregnating solutions respectively contained instead of the indium containing solution:

2.5 g of a tin acetate solution with a 20% tin content for catalyst A.
2.5 g of a thallium acetate solution containing 20% by weight of thallium for catalyst C,
30 g of an aqueous solution of oxal-germanium complex aqueous solution containing 17% by weight of germanium, for catalyst D, and
10 cc of a gallium nitrate solution containing 50 g of gallium per liter for catalyst E.

These five catalysts have been used for the treatment of a naphtha having the following characteristics:

| | |
|---|---|
| A.S.T.M. distillation | 80°–160° C. |
| composition: aromatic hydrocarbons | 7% by weight |
| naphthenic hydrocarbons | 27% by weight |
| paraffinic hydrocarbons | 66% by weight |
| "clear research" octane number | about 37 |
| average molecular weight | 110 |
| specific gravity at 20° C. | 0.782 |

This naphtha is passed with recycle hydrogen over catalysts A–E in such a manner as to obtain a clear octane number of 96.2.

The operating conditions are as follows:

| | |
|---|---|
| Pressure | 20 bars |
| Ratio H₂/hydrocarbons (moles) | 5 |
| (ratio equal here to the recycle rate) | |
| Naphtha weight/catalyst weight/hour | 3 |

The temperature at the inlet of the reactor is 490° C.±1° C. (It has then to be progressively raised up to 530° C. in view of maintaining the octane number at a constant level).

The following Table I gives, for catalysts A to E, the yeild of C₅+ and the percent of hydrogen contained in the recycle gas when the desired octane number has been obtained.

TABLE I

| CATALYST | | | | YIELD | RECYCLE GAS |
|---|---|---|---|---|---|
| | % | % by weight | | % C₅+ | % H₂ |
| | Pt | % Second Metal | % W | (by weight) | (in moles) |
| A | 0.2 | 0.5 Tin | 0.2 | 82.5 | 82.4 |
| B | 0.2 | 0.5 Indium | 0.2 | 82.8 | 82.7 |
| C | 0.2 | 0.5 Thallium | 0.2 | 82.7 | 82.6 |
| D | 0.2 | 0.5 Germanium | 0.2 | 82.5 | 82.3 |
| E | 0.2 | 0.5 Gallium | 0.2 | 82.6 | 82.5 |

EXAMPLE 1.A (Comparative)

Example 1 is repeated except that there is used a catalyst F containing 0.2% of platinum and 0.2% of tungsten, and catalysts G to K having the compositions given in Table II.

TABLE II

| CATALYST | % Pt by weight | % SECOND METAL |
|---|---|---|
| G | 0.2 | 0.5% Tin |
| H | 0.2 | 0.5% Indium |
| I | 0.2 | 0.5% Thallium |
| J | 0.2 | 0.5% Germanium |
| K | 0.2 | 0.5% Gallium |

These catalysts F to K all contain 1.18% of chlorine. The results obtained therewith are slightly inferior to those obtained with catalysts A to E, said results being given in Table III below.

TABLE III

| CATA-LYST | Metal % By Weight With Respect to Alumina | | | YIELD $C_5^+$ (weight) | RECYCLE GAS % $H_2$ (molar) |
|---|---|---|---|---|---|
| F | 0.2% platinum | — | 0.2% tungsten | 82.1 | 82.3 |
| G | 0.2% platinum | 0.5% Tin | — | 82.4 | 82.3 |
| H | 0.2% platinum | 0.5% Indium | — | 82.5 | 82.3 |
| I | 0.2% platinum | 0.5% Thallium | — | 82.3 | 82.4 |
| J | 0.2% platinum | 0.5% Germanium | — | 82.3 | 82.2 |
| K | 0.2% platinum | 0.5% Gallium | — | 82.3 | 82.5 |

In fact, the superiority of the catalyst used according to this invention is essential in a process conducted under severe conditions, as shown in example 2, for producing gasoline of a clear octane number higher than, for example, 102.

EXAMPLE 2

The production of gasoline of high octane number requires very severe operating conditions which were hardly tolerated by the catalysts used up to now (temperature from 510° to 580° C. and recycle rate—or here ratio $H_2$/Hc—from 6 to 10 moles of hydrogen per mole of charge). The use of various two- or three-metal catalysts has however resulted in a clear improvement. Unfortunately, among the very large number of metals used in these two- or even three-metal catalysts to impart to the catalyst a very good stability also introduce a certain tendency to hydrogenolysis which, finally, results in a decrease of the field, in a shortening of the cycle period and in a reduction of the possible number of cycles, i.e. in a decrease of the catalyst life time. On the contrary, the addition of tungsten to one of the pairs, platinum-thallium, platinum-indium or platinum-gallium, clearly attenuates these effects or clearly reduces the tendency to hydrogenolysis and it has been observed that the beneficial effect due the presence of tungsten is at a maximum in the case of severe operating conditions, particularly under low pressures, high temperatures and long operation times.

This example shows that it is not only possible but strongly recommended to proceed in the presence of the three catalysts according to the invention, especially under very severe conditions, in order to obtain gasoline of very high octane number.

The charge of example 1 is treated to produce gasoline having a clear octane number of 103. The operating conditions are as follows:

| pressure | 10 bars |
|---|---|
| temperature | 530° C. |
| molar ratio $H_2$/hydrocarbons (ratio equal here to the recycle rate) | 8 |
| naphtha weight/catalyst weight/hour | 1.65 |

The operation is conducted in the presence of catalysts B, C and E according to the invention as well as in the presence of various catalysts other than those of the invention, comprising either two metal elements (catalysts F to K), or three metal elements (catalysts A and D), or a single metal element (catalysts L and L' respectively containing 0.2 and 0.4% by weight of platinum with respect to the catalyst carrier).

Table IV indicates the $C_5^+$ yield obtained and the hydrogen percent contained in the recycle gas after 200 hours of run.

The results obtained in said example 2 with catalysts B, C and E according to the invention may be maintained over a long time, i.e. periods of, for example, several months, while proceeding continuously in a reactor or reaction zone with a moving bed, the catalyst being withdrawn, for example, continuously, at a rate so adjusted as to progressively replace the whole catalyst bed of the reactor with fresh catalyst, for example in about 500 hours.

TABLE IV

| CATA-LYST | Metal % With Respect To The Catalyst Carrier | | | $C_5^+$ YIELD (weight) | RECYCLE GAS % $H_2$ (molar) |
|---|---|---|---|---|---|
| A | 0.2% Platinum | 0.5 % Tin | 0.2% Tungsten | 79.7 | 79.2 |
| L | 0.2% Platinum | — | — | 73.1 | 72.7 |
| L' | 0.4% Platinum | — | — | 73.2 | 72.8 |
| F | 0.2% Platinum | — | 0.2% Tungsten | 76.2 | 75.4 |
| G | 0.2% Platinum | 0.5% Tin | — | 76.6 | 76.2 |
| B | 0.2% Platinum | 0.5% Indium | 0.2% Tungsten | 80.3 | 80.2 |
| H | 0.2% Platinum | 0.5% Indium | — | 75.5 | 75.2 |
| C | 0.2% Platinum | 0.5% Thallium | 0.2% Tungsten | 80.1 | 79.7 |
| I | 0.2% Platinum | 0.5% Thallium | — | 74.9 | 75.0 |
| D | 0.2% Platinum | 0.5% Germanium | 0.2% Tungsten | 79.8 | 79.6 |
| J | 0.2% Platinum | 0.5% Germanium | — | 75.1 | 75.1 |
| E | 0.2% Platinum | 0.5% Gallium | 0.2% Tungsten | 80.0 | 80.1 |

TABLE IV-continued

| CATA-LYST | Metal % With Respect To The Catalyst Carrier | | | C₅+ YIELD (weight) | RECYCLE GAS % H₂ (molar) |
|---|---|---|---|---|---|
| K | 0.2% Platinum | 0.5% Gallium | — | 74.9 | 75.3 |

EXAMPLE 3

Example 2 is repeated with catalysts containing (a) platinum, (b) tin or indium or germanium or thallium or gallium and (c) tungsten, and the tungsten content is varied, while the platinum, tin, indium, germanium, thallium and gallium percents remain constant.

The metal content and the results obtained are given in Table V. All these catalysts contain 1.18% by weight of chlorine.

TABLE V

| CATA-LYST | Metal % By Weight With Respect To The Catalyst Carrier | | Tungsten % | C₅+ YIELD (weight) | RECYCLE GAS % H₂ (molar) |
|---|---|---|---|---|---|
| A₁ | 0.2% Platinum | 0.5% Tin | 0.02 | 78.2 | 77.8 |
| A₂ | 0.2% Platinum | 0.5% Tin | 0.1 | 79.3 | 78.1 |
| A | 0.2% Platinum | 0.5% Tin | 0.2 | 79.7 | 79.2 |
| A₃ | 0.2% Platinum | 0.5% Tin | 0.5 | 79.2 | 78.4 |
| B₁ | 0.2% Platinum | 0.5% Indium | 0.02 | 77.9 | 77.4 |
| B₂ | 0.2% Platinum | 0.5% Indium | 0.1 | 79.9 | 79.8 |
| B | 0.2% Platinum | 0.5% Indium | 0.2 | 80.3 | 80.2 |
| B₃ | 0.2% Platinum | 0.5% Indium | 0.5 | 78.2 | 77.9 |
| C₁ | 0.2% Platinum | 0.5% Thallium | 0.02 | 78.1 | 77.6 |
| C₂ | 0.2% Platinum | 0.5% Thallium | 0.1 | 80.0 | 79.3 |
| C | 0.2% Platinum | 0.5% Thallium | 0.2 | 80.1 | 79.7 |
| C₃ | 0.2% Platinum | 0.5% Thallium | 0.5 | 78.1 | 77.6 |
| D₁ | 0.2% Platinum | 0.5% Germanium | 0.02 | 77.8 | 77.9 |
| D₂ | 0.2% Platinum | 0.5% Germanium | 0.1 | 79.2 | 78.5 |
| D | 0.2% Platinum | 0.5% Germanium | 0.2 | 79.8 | 79.6 |
| D₃ | 0.2% Platinum | 0.5% Germanium | 0.5 | 79.4 | 79.0 |
| E₁ | 0.2% Platinum | 0.5% Gallium | 0.02 | 78.0 | 77.6 |
| E₂ | 0.2% Platinum | 0.5% Gallium | 0.1 | 79.4 | 79.5 |
| E | 0.2% Platinum | 0.5% Gallium | 0.2 | 80.0 | 80.1 |
| E₃ | 0.2% Platinum | 0.5% Gallium | 0.5 | 79.3 | 79.6 |

What we claim is:

1. In a process for reforming a hydrocarbon feed in the presence of a catalyst, the improvement which comprises using as said catalyst a catalyst containing an alumina carrier and, by weight with respect to the alumina carrier, from 0.005 to 1% of platinum, 0.01 to 4% of a metal selected from gallium, indium and thallium, 0.01 to 2% of tungsten and 0.1 to 10% of halogen.

2. In a process for producing aromatic hydrocarbons using a hydrocarbon feedstock in the presence of a catalyst, the improvement which comprises using as said catalyst a catalyst containing an alumina carrier and, by weight with respect to the alumina carrier, from 0.005 to 1% of platinum, 0.01 to 4% of a metal selected from gallium, indium and thallium, 0.01 to 2% of tungsten and 0.1 to 10% of halogen.

3. The process of claim 1 for the treatment of a naphtha feed by catalytic reforming, wherein said process is effected at a temperature higher than 510° C., with a recycle rate from 6 to 10 moles of hydrogen per mole of charge.

4. The process of claim 1, wherein said catalyst contains, by weight with respect to the carrier, 0.05 to 0.8% of platinum and 0.05 to 3% of a metal selected from gallium, indium and thallium.

5. The process of claim 4, wherein said catalyst contains, by weight with respect to the carrier, 0.3 to 0.9% of a metal selected from indium, thallium or gallium and 0.1 to 0.3% of tungsten.

6. The process of claim 5, wherein said metal is indium.

7. The process of claim 5, wherein said metal is thallium.

8. The process of claim 5, wherein said metal is gallium.

9. The process of claim 1, wherein said alumina carrier has a specific surface area of from 50 to 600 m²/g.

10. The process of claim 1, for the treatment of a naphtha feed wherein said process is effected at an average temperature of from 450° to 580° C., a pressure of from 5 to 20 kg/cm², an hourly rate of from 0.5 to 10 volumes of liquid naphtha per catalyst volume, and a recycle rate of from 1 to 10 moles of hydrogen per mole of charge.

11. The process of claim 1, wherein the feed is a naphtha distilling between about 60° C. and about 220° C.

12. The process of claim 1, wherein the feed is a straight run naphtha.

13. The process of claim 2, wherein said catalyst contains, by weight with respect to the carrier, 0.05 to 0.8% of platinum and 0.05 to 3% of a metal selected from gallium, indium and thallium.

14. The process of claim 13, wherein said catalyst contains, by weight with respect to the carrier, 0.3 to 0.9% of a metal selected from indium, thallium or gallium and 0.1 to 0.3% of tungsten.

15. The process of claim 14, wherein said metal is indium.

16. The process of claim 14, wherein said metal is thallium.

17. The process of claim 14, wherein said metal is gallium.

18. The process of claim 2, wherein said alumina carrier has a specific surface area of from 50 to 600 m²/g.

19. The process of claim 2, wherein said hydrocarbon feed is saturated gasoline.

20. The process of claim 2, wherein said hydrocarbon feed is unsaturated gasoline which has been made free of substantially all the diolefins and monoolefins contained therein.

21. The process of claim 2, wherein said process is effected in the presence of hydrogen at a temperature of from 530° to 600° C., a pressure of from 1 to 60 kg/cm², an hourly flow rate of from 0.1 to 10 volumes of feed per catalyst volume, and a molar ratio of hydrogen to hydrocarbons of from 0.5 to 20.

* * * * *